United States Patent

Rain

[11] 4,022,522
[45] May 10, 1977

[54] PROJECTION SCREEN
[75] Inventor: Lloyd Howard Rain, Lexington, Ky.
[73] Assignee: Irvin Industries, Inc., Greenwich, Conn.
[22] Filed: June 30, 1975
[21] Appl. No.: 591,627
[52] U.S. Cl. .................................. 350/117; 40/155; 350/125
[51] Int. Cl.[2] ........................................ G03B 21/56
[58] Field of Search ............. 350/117, 125; 40/155

[56] References Cited
UNITED STATES PATENTS 2,753,818  7/1956  Green ........................... 350/125 X
3,720,455  3/1973  Sahlin .............................. 350/117

Primary Examiner—Richard A. Wintercorn
Attorney, Agent, or Firm—McAulay, Fields, Fisher & Goldstein

[57] ABSTRACT

A tailored membrane supported solely by a peripheral frame forms the front panel of a chamber. A source of vacuum or an air blower maintains a pressure in the chamber which differs from that of the ambient atmosphere. As a result, the tailored membrane is either drawn forward or pushed taut to provide a concave or convex viewing surface having a configuration determined solely by its tailoring.

6 Claims, 4 Drawing Figures

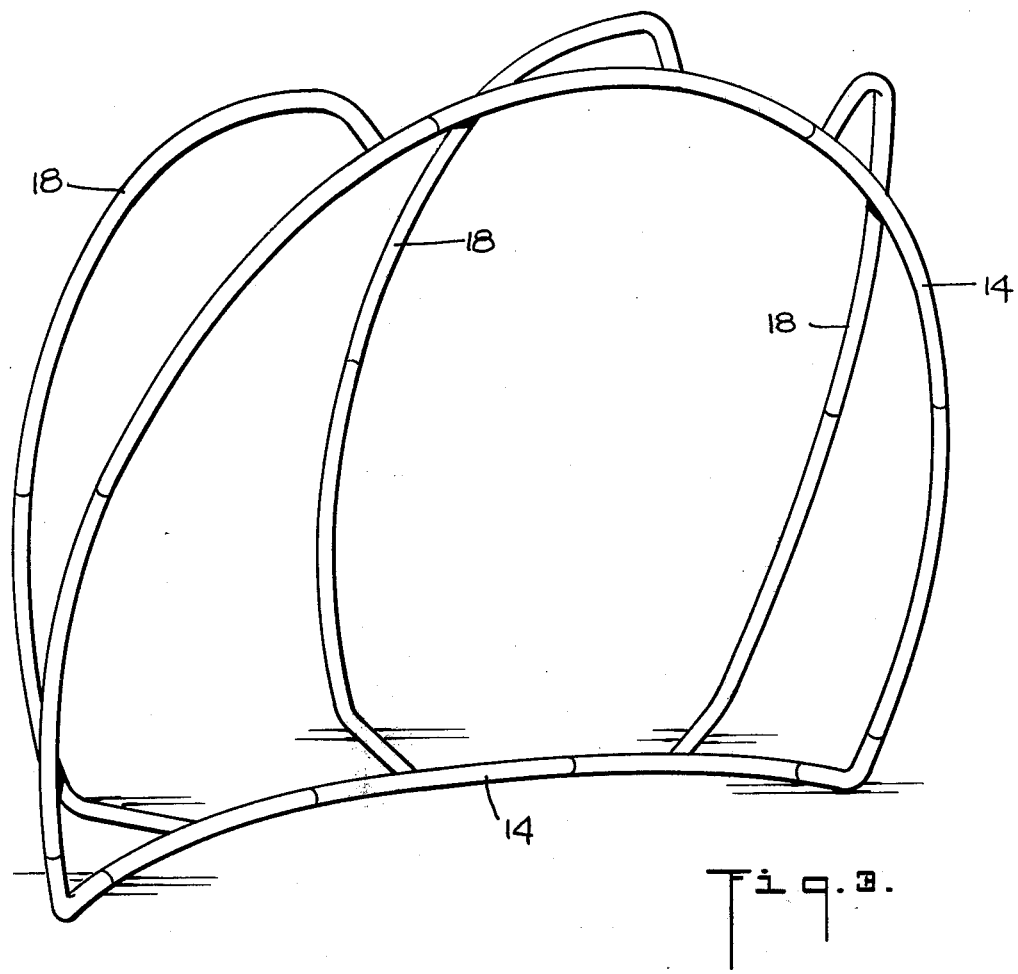
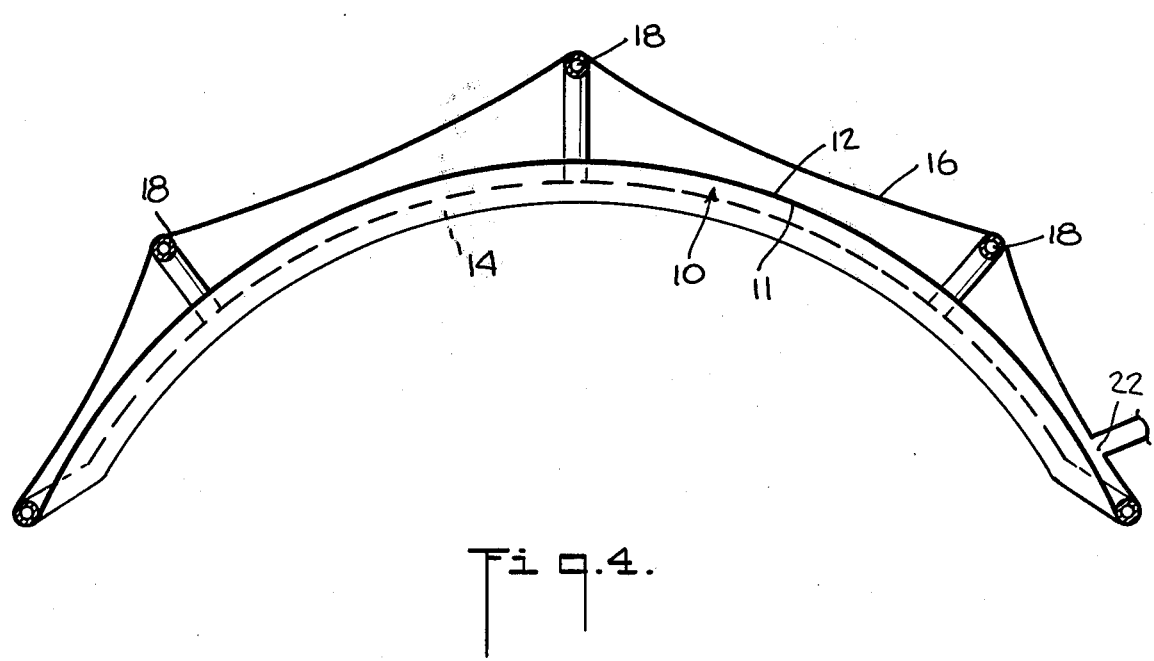

PROJECTION SCREEN

BACKGROUND OF THE INVENTION

Large curved projection screens are costly items. Their cost is a non-linear function of their size. Yet, there is an increasing demand for large curved screens to provide the effect of presence that is desired in so many film and multimedia presentations.

Accordingly, it is a major purpose of this invention to provide a novel projection screen which can be constructed and maintained for a fraction of the cost of currently available structures.

A major objective in such a screen is to provide a smooth continuous surface which is free from irregularities since such irregularities tend to distort the image and obtrude into the view of the audience thereby taking away from the presence effect which is the purpose of a large curved screen to provide. Obtaining smooth continuous screen without irregularities is one of the major factors in increasing the cost of a large curved screen. Prior art screens are usually constructed by cementing large pie-shaped sections of heavy foam or wood to a backboard and then painting or taping the junction lines of the partial-spherical surface tus created. The junctions between the pie-shaped sections cause irregularities and distracting visual lines.

Accordingly, it is an important purpose of this invention to provide a relatively inexpensive curved screen which is at the same time smooth, continuous and free of irregularities.

A further related purpose of this invention is to provide a screen structure which remains reasonable in cost in large sizes while still meeting the requirements of being curved and free of irregularities.

It is a further purpose of this invention to provide a screen structure which maintains its predetermined shape and curvature over long periods of use.

It is a further purpose of this invention to provide a structural design which can be adopted to provide a screen having both vertical and horizontal curvature.

BRIEF DESCRIPTION

In brief, this invention involves the use of a tailored membrane which when inflated provides the desired curved projection surface. This tailored membrane has a viewing surface and a back surface. The back surface of the tailored membrane faces into a single chamber or plenum which is continuous across the back surface of the membrane. A source of vacuum is connected to the chamber to draw a partial vacuum. When the vacuum is drawn the lesser pressure on the back surface of the screen draws the membrane back to provide a curved viewing surface having shape and curvature that is predetermined by the tailoring of the membrane. The flexible membrane provides the shape of the veiwing surface. The membrane is supported solely at its edges and when drawn back has its back surface in contact solely with the atmosphere in the chamber so that there are no irregularities in the viewing surface and the viewing surface has precisely the shape and curvature predetermined by the tailoring of the membrane.

The other or rearward wall of the chamber is defined by a second membrane also supported along its edge by the frame which supports the tailored membrane. Various stays that extend back from the edge frame hold the second membrane back so that it does not collapse into the chamber when vacuum is drawn.

THE DRAWINGS

FIG. 3 is a perspective view of the FIG. 1 embodiment with the screen membrane and back membrane removed.

FIG. 4 is a section along the line 4—4 of FIG. 1.

DESCRIPTION OF THE PREFERRED EMBODIMENT

Figure 1:
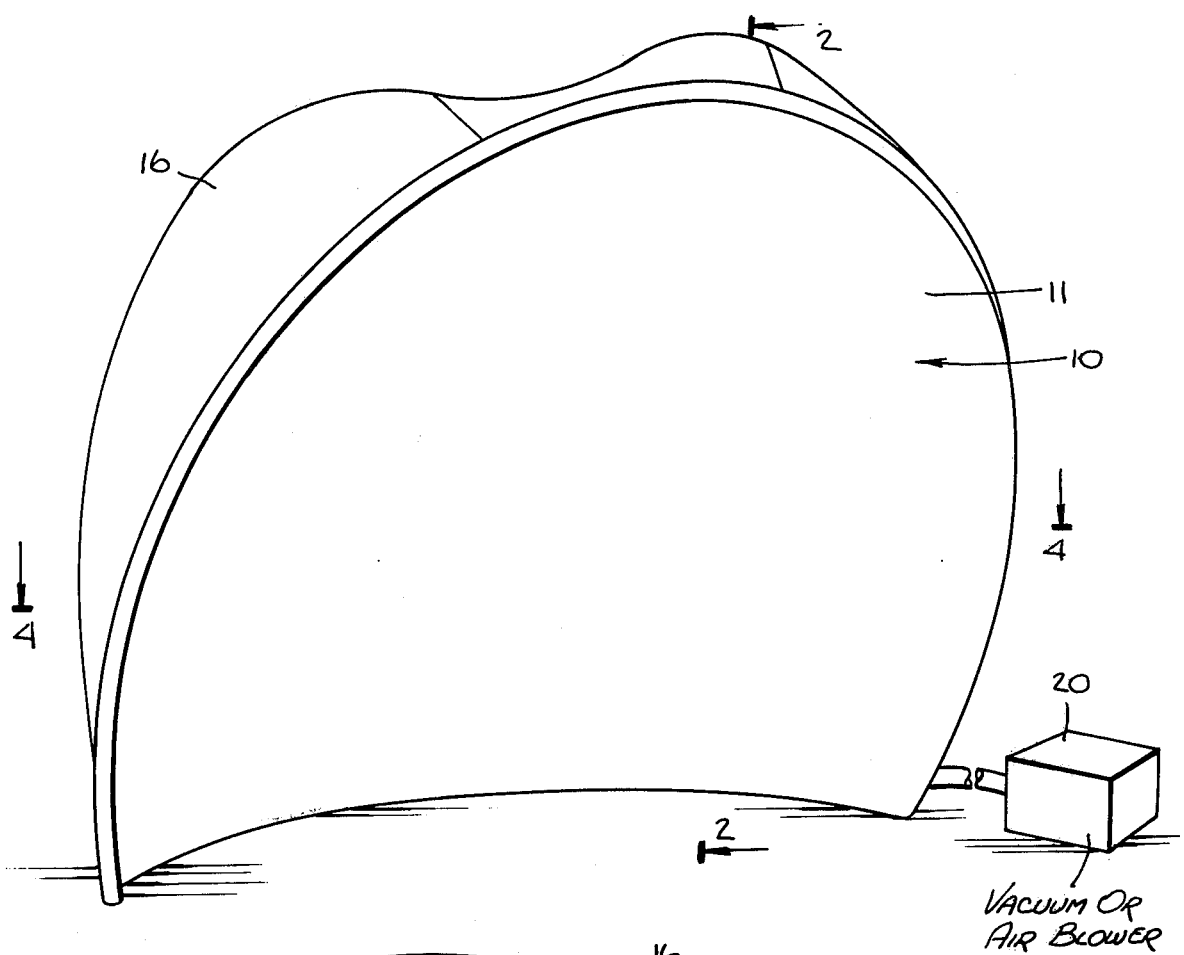
FIG. 1 is a perspective view of an embodiment of this invention
Figure 2:
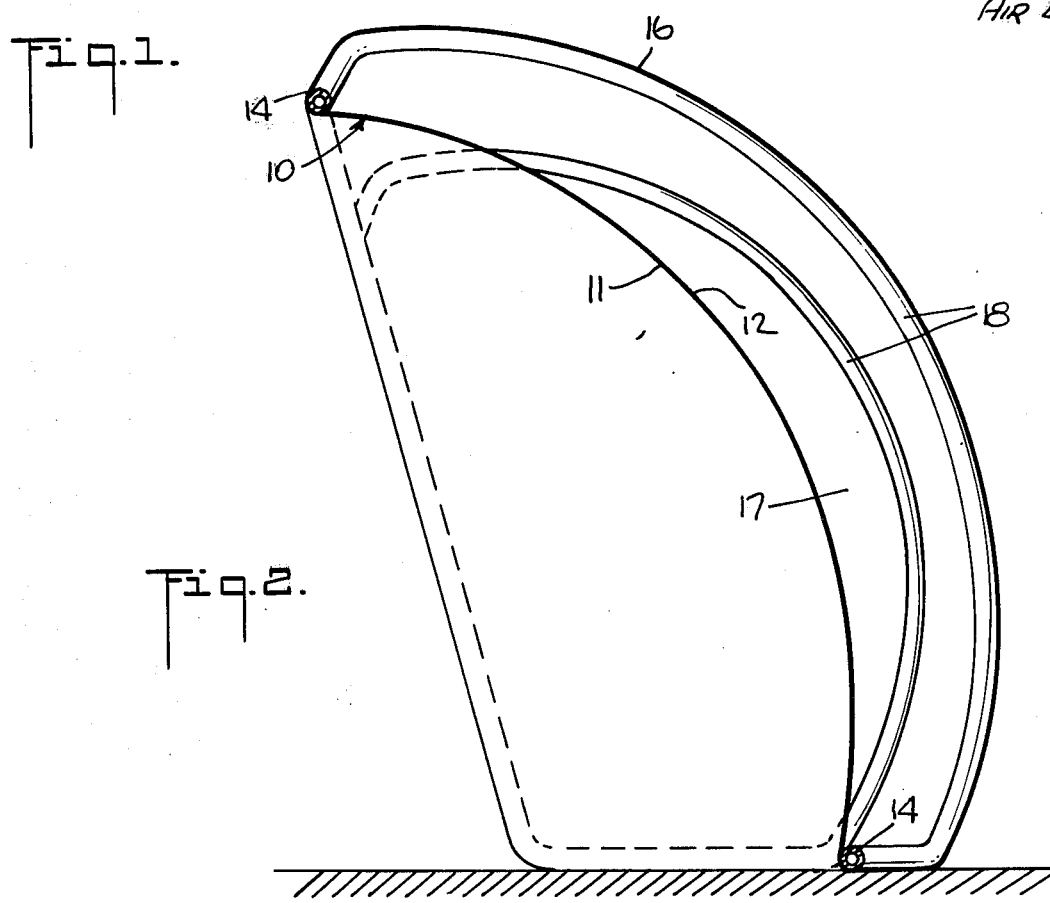
FIG. 2 is a section along the line 2—2 of FIG. 1.

With reference to the FIGS., all of which illustrate the same embodiment, there is a membrane 10 which is tailored such that when stretched taut it has a spherical configuration. The concave surface 11 of this membrane 10 constitutes the viewing surface of the screen. The convex surface 12 of this screen membrane 10 is its back surface.

The membrane 10 is supported along its edges by an aluminum tubular frame 14. This edge frame 14 is the sole support for the membrane 10. A back panel 16 provides a wall which together with the membrane 10 defines a chamber 17. This back panel 16 is, in the embodiment shown, a substantially air impervious membrane. This membrane 16 is supported by three tubular aluminum stay structures 18.

A source of vacuum 20 communicates with the chamber 17 through a port 22. When vacuum is drawn, the screen membrane 10 is pulled taut into the chamber 17 to provide the desired smooth continuous surface. The back membrane 16 is also drawn into the chamber 17. But because of the three stays 18, this back membrane 16 is held back from contact with the screen membrane 10. Thus, the chamber 17 is maintained as a continuous chamber extending across the entire surface of the screen membrane 10 to provide an even force across the surface of the screen membrane 10 and to assure that there is no physical obstruction to the shaping of the screen membrane 10.

The back membrane 16, like the screen membrane 10, may be connected to and supported by the edge frame structure 14. But, the back membrane 16 is further supported by the three stays 18 while the front screen membrane 10 is not further supported by any physical structure.

Both membranes 10 and 16 are preferably substantially air impervious. However, as long as any seepage of air through these membranes or their perimeter areas of attachment is at a rate less than can be drawn out by the source of the vacuum 20, the structure will perform its function. The connection of the two membranes 10 and 16 to the edge frame 14 must provide a relatively air tight seal so that the partial vacuum in the chamber 17 will not be destroyed. As a practical matter, most leakage will probably occur in this attachment area.

In one embodiment that has been built and tested, the membrane screen 10 when stretched taut was a portion of sphere having a diameter of nearly twenty (20) feet. A partial vacuum of about 1/2 inch as measured by water gauge (that is, a vacuum of approximately 0.016 psi) was found useful and adequate in that embodiment. However, the vacuum may vary from one-tenth of an inch to ten inches or more (water gauge depending upon the size of the screen and the degree of screen rigidity desired.

The above structural arrangement makes it possible to employ a membrane surface as the viewing surface even though the membrane is not capable of sustaining compression and large amounts of shear. For all intents and purposes the membrane 10 can sustain only tension forces. The use of a chamber 17 in which a partial vacuum is drawn to thereby cause the outside atmosphere to force the membrane 10 into the chamber until the membrane 10 is taut is the technique whereby this membrane 10 can be supported entirely under tension to provide a curved viewing surface. Because there is only one chamber 17, there are no support or other structures to show through as irregularities on the viewing surface 11 of the membrane 10. Further, because there is one chamber 17, there is equal pressure over the entire surface of the screen. This uniform pressure eliminates irregularities on the viewing surface 11 that would occur if the pressure were not uniform.

The material used for the screen 10 can be a standard material such as a woven nylon substrate on which a vinyl surface has been laid to provide the desired smooth viewing surface 11 which more adequately reflects light. The membrane 10 is tailored from a set of pie-shaped sections which are welded together using high frequency radio welding to provide a viewing surface with substantially non-visible junction lines between sections.

In operation, a spherical lens to project the scene on this spherical viewing surface 11 provides a simple and effective way to create the presence which is usually a major purpose in using a concave curved viewing screen.

The same membrane and frame structure can be employed to provide a convex viewing surface by replacing the source of vacuum 20 with an air blower. Nothing else need be changed. The membranes 10 and 16 will then bow outward from the chamber 17 due to air pressure created by the air blower. The result is a convex viewing surface 11. In such an application of the invention, the membrane 10 would have to be translucent. The projector will then be placed behind the membrane 10 either within the chamber 17, extending into the chamber 17 or behind the rearward membrane 16. In the latter case the membrane 16 will have to be essentially transparent. The blower used to provide a pressure within the chamber 17 that is greater than ambient can be the same unit used to create the partial vacuum when providing the concave screen 11. The blower simply has to be turned around 180° to provide either less or more pressure than ambient and thus provide either a concave or convex viewing surface 11.

What is claimed is:

1. A free-standing, self-contained, mobile projection screen comprising:
    a rigid frame,
    a plurality of stays having their ends attached to and supporting said frame,
    a continuous tailored membrane having a back surface and a front viewing surface,
    a second continuous membrane spaced from said back surface of said first membrane,
    said first membrane and said second membrane being connected to form an envelope enclosing said frame and stays and defining a single chamber, and
    means in communication with said chamber to maintain a differential pressure between the atmosphere in said chamber and the ambient atmosphere,
    said first membrane being drawn taut when said differential pressure is maintained to provide a viewing surface configuration determined solely by the predetermined tailoring of said membrane,
    said back surface of said first membrane, when drawn taut, being in contact solely with said atmosphere in said chamber.

2. The projection screen of claim 1 wherein:
    said means for maintaining a differential pressure is a source of vacuum,
    said first membrane being drawn back into said chamber when vacuum is drawn on said chamber to provide a concave viewing surface, and
    said second membrane being held away from contact with said first membrane by said stays when vacuum is drawn on said chamber.

3. The projection screen of claim 1 wherein:
    said means for maintaining a differential pressure is an air blower to provide a pressure within said chamber greater than ambient pressure,
    said first membrane being forced forward by the differential pressure to provide a convex viewing surface.

4. The projection screen of claim 1 wherein said first membrane and said second membrane are substantially air impervious.

5. The projection screen of claim 2 wherein said first membrane and said second membrane are substantially air impervious.

6. The projection screen of claim 3 wherein said first membrane and said second membrane are substantially air impervious.

* * * * *